(12) United States Patent
Ghosh

(10) Patent No.: US 10,291,554 B1
(45) Date of Patent: May 14, 2019

(54) HYBRID NETWORK FUNCTION VIRTUALIZATION

(71) Applicant: Juniper Networks, Inc., Sunnyvale, CA (US)

(72) Inventor: Sandip Kumar Ghosh, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 25 days.

(21) Appl. No.: 15/612,521

(22) Filed: Jun. 2, 2017

(51) Int. Cl.
*H04L 12/931* (2013.01)
*H04L 12/24* (2006.01)

(52) U.S. Cl.
CPC .......... *H04L 49/70* (2013.01); *H04L 41/0803* (2013.01)

(58) Field of Classification Search
CPC .................. H04L 41/0803; H04L 49/70
See application file for complete search history.

(56) References Cited

U.S. PATENT DOCUMENTS

| | | | | |
|---|---|---|---|---|
| 8,943,489 B1* | 1/2015 | Qu | .......................... | G06F 8/656 717/168 |
| 8,953,439 B1* | 2/2015 | Lin | ..................... | G06F 11/1484 370/218 |
| 2013/0091376 A1* | 4/2013 | Raspudic | ............ | G06F 11/1484 714/3 |
| 2013/0346470 A1* | 12/2013 | Obstfeld | ............... | G06F 9/5044 709/202 |
| 2016/0364174 A1* | 12/2016 | Colbert | ................. | G06F 3/0617 |

OTHER PUBLICATIONS

Libvirt, "Networking," https://wiki.libvirt.org/page/Networking, Mar. 22, 2017, 12 pages.

* cited by examiner

*Primary Examiner* — Benjamin H Elliot, IV
(74) *Attorney, Agent, or Firm* — Harrity & Harrity, LLP

(57) ABSTRACT

A device may determine first configuration information associated with configuring a chassis. The device may configure the chassis in a first mode using the first configuration information to cause the chassis to perform routing for a network. The device may determine, after a first period of routing for the network, second configuration information associated with configuring the chassis. The second configuration information may relate to utilizing one or more computing resources of a server device external to the chassis to perform routing for the chassis. The device may configure the chassis in a second mode using the second configuration information to cause the chassis to perform, in a second period, routing for the network.

20 Claims, 11 Drawing Sheets

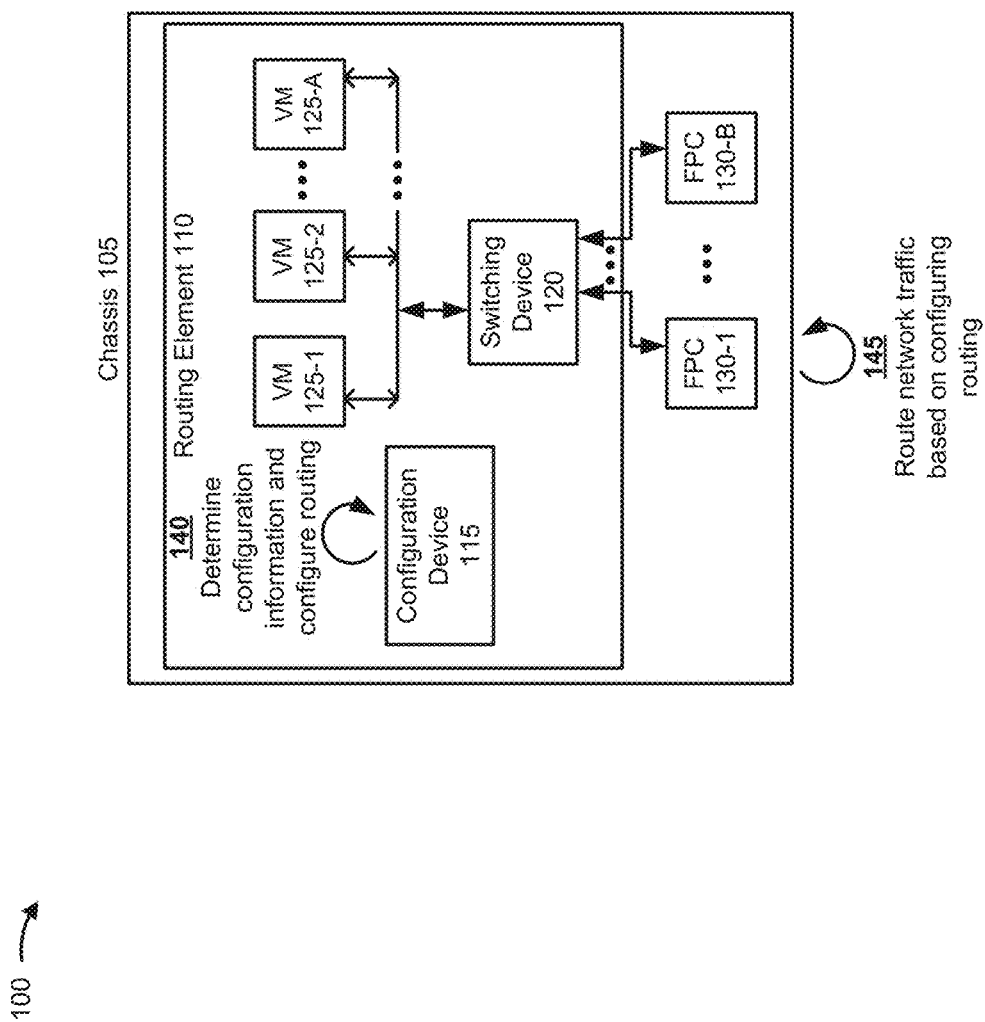

HYBRID NETWORK FUNCTION VIRTUALIZATION

BACKGROUND

A set of network devices may perform network traffic routing for a network. For example, a particular network device housed in a chassis may include a set of virtual machines that provide a switching functionality, a packet processing functionality, a routing functionality, or the like for the particular network device. The particular network device may establish the set of virtual machines to provide multiple network slices for network traffic routing. Each network slice may be associated with control functionalities and management functionalities that may be separated from each other network slice. The particular network device may connect to, for example, a server, which may provide computing resources for the particular network device, such as storage resources, processing resources, or the like. The computing resources may be utilized for the set of virtual machines.

SUMMARY

According to some possible implementations, a device may include one or more processors. The one or more processors may determine first configuration information associated with configuring a chassis. The one or more processors may configure the chassis in a first mode using the first configuration information to cause the chassis to perform routing for a network. The one or more processors may determine, after a first period of routing for the network, second configuration information associated with configuring the chassis. The second configuration information may relate to utilizing one or more computing resources of a server device external to the chassis to perform routing for the chassis. The one or more processors may configure the chassis in a second mode using the second configuration information to cause the chassis to perform, in a second period, routing for the network.

According to some possible implementations, a non-transitory computer-readable medium may store one or more instructions that, when executed by one or more processors, cause the one or more processors to determine configuration information associated with configuring a chassis to migrate a network slice routing functionality between a first virtual machine implemented by computing resources of the chassis and a second virtual machine implemented by computing resources of a server device external to the chassis. The one or more instructions, when executed by one or more processors, may cause the one or more processors to configure the chassis using the configuration information to migrate the network slice routing functionality between the first virtual machine and the second virtual machine.

According to some possible implementations, a method may include determining, by a device, first configuration information associated with configuring a chassis. The first configuration information may relate to utilizing only one or more computing resources of the chassis to perform routing for the chassis. The method may include configuring, by the device, the chassis in a first mode using the first configuration information to cause the chassis to perform routing for a network. The method may include determining, by the device and after configuring the chassis in the first mode, second configuration information associated with configuring the chassis. The second configuration information may relate to utilizing one or more computing resources of a server device external to the chassis to perform routing for the chassis. The method may include configuring, by the device, the chassis in a second mode using the second configuration information to cause the chassis to perform routing for the network. A network slice may be migrated from a first virtual machine implemented using the one or more computing resources of the chassis to a second virtual machine implemented using the one or more computing resources of the server device. The migration may be performed using a state transition of the first virtual machine from a primary state to a backup state and the second virtual machine from a backup state to a primary state.

BRIEF DESCRIPTION OF THE DRAWINGS

FIGS. 1A and 1B are diagrams of an overview of an example implementation described herein;

DETAILED DESCRIPTION

The following detailed description of example implementations refers to the accompanying drawings. The same reference numbers in different drawings may identify the same or similar elements.

A network operator may utilize a set of network devices to perform switching and routing for a network. The set of network devices may be included in a chassis. For example, a particular chassis may include a set of routers with a set of physical interface cards (PICs), flexible PIC concentrators (FPCs), control board (CB) switches, or the like. The network operator may establish multiple network slices for the chassis using multiple virtual machines operated using computing resources of the chassis. Each network slice may provide a control plane and a management plane, and may perform network routing for a portion of network traffic of a data plane. However, resources for establishing network slices may be limited for a particular chassis, which may reduce scalability of the network. The network operator may utilize a server to operate the virtual machines external to the chassis. However, initial investment to install the server may be excessive for an initial requirement for network traffic routing, and may result in an excessive footprint and excessive power resource utilization to perform routing for the network.

Some implementations, described herein, provide hybrid network traffic routing utilizing virtual machines. For example, a chassis may be configured to perform network traffic routing using virtual machines of the chassis to establish network slices, and may be reconfigured at a subsequent time to perform network traffic routing using one or more virtual machines operating on an external server that is subsequently installed. In this way, scalability may be improved relative to a chassis that operates each virtual machine locally, and resource utilization, expense, and footprint may be deferred relative to requiring a server to be installed with the chassis for a network that is not initially associated with network traffic routing exceeding a capability of the chassis alone. Moreover, some implementations, described herein, may manage migration of a virtual machine from operating locally in a chassis to operating remotely in a server. In this way, computing resources allocated for network traffic routing may be increased by installing a server remote to the chassis and without interrupting network traffic routing by deactivating the chassis for reconfiguration of a virtual machine.

Figure 1B:
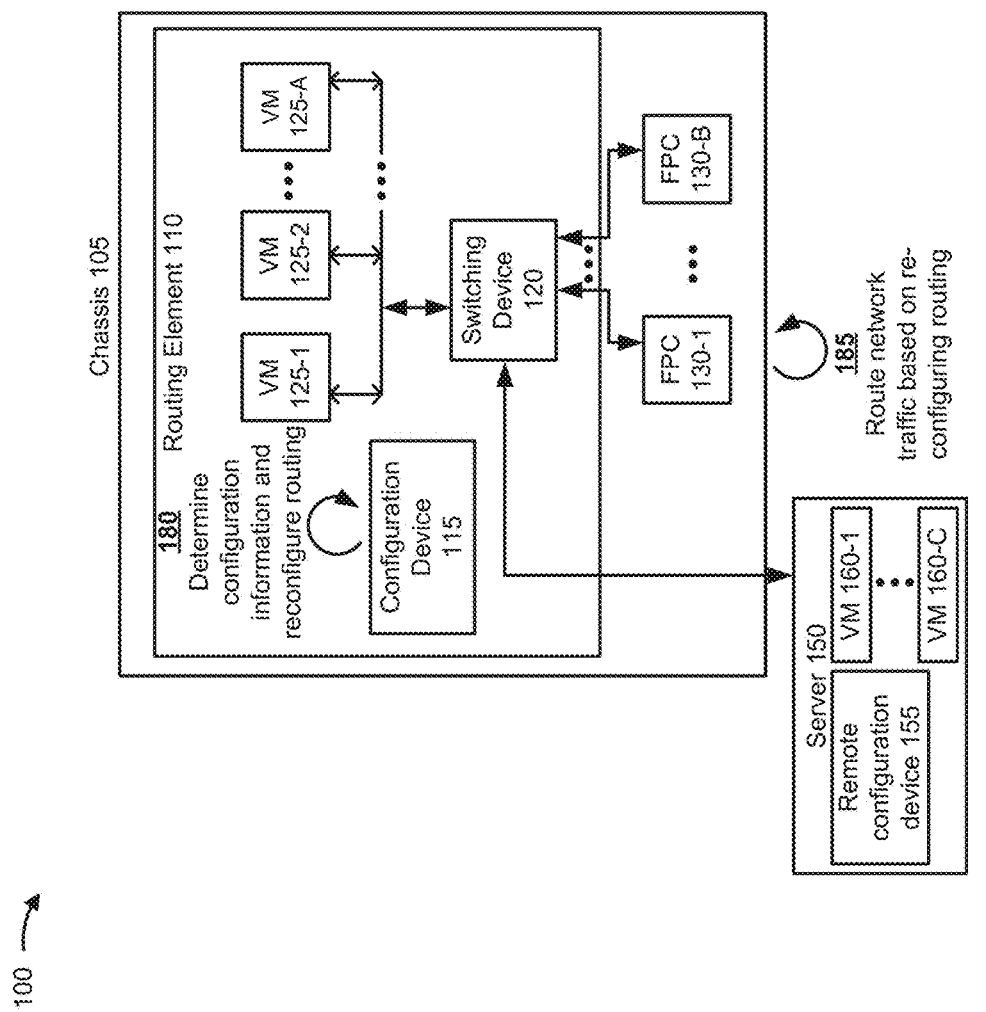

FIGS. 1A and 1B are diagrams of an overview of an example implementation 100 described herein. As shown in FIG. 1A, example implementation 100 may include a chassis 105, which includes one or more network devices and/or computing resources. The one or more network devices and/or computing resources may include and/or implement a routing element 110, a configuration device 115, a switching device 120, a set of virtual machines (VMs) 125-1 through 125-A (hereinafter referred to collectively as "virtual machines 125" and individually as "virtual machine 125"), and a set of FPCs 130-1 through 130-B (hereinafter referred to collectively as "FPCs 130" and individually as "FPC 130").

As further shown in FIG. 1A, and by reference number 140, configuration device 115 may determine configuration information, and may configure a network slice for routing. For example, configuration device 115 may determine the configuration information based on detecting a set of resources of chassis 105, such as identifying a quantity of cores of chassis 105, determining whether hyper-threading is enabled for chassis 105, identifying an amount of storage or memory of chassis 105, identifying a set of physical functions (PFs) and/or virtual functions (VFs) of chassis 105, or the like. Additionally, or alternatively, configuration device 115 may receive configuration information based on providing a user interface. Configuration device 115 may determine a quantity of network slices to configure for configuration device 115, such as based on receiving a selection of the quantity of network slices, based on the set of resources of chassis 105, or the like. In this case, configuration device 115 may establish the set of virtual machines 125 corresponding to the network slices, and may cause the set of virtual machines 125 to be connected to the set of FPCs 130 via switching device 120. As shown by reference number 145, based on establishing the set of virtual machines 125 and connecting the set of virtual machines 125 to the set of FPCs 130, configuration device 115 may cause chassis 105 to route network traffic. For example, chassis 105 may route network traffic using the set of network slices corresponding to the set of virtual machines (e.g., each network slice may be used to perform routing independently of each other network slice).

As shown in FIG. 1B, at a subsequent time after configuring network traffic routing for chassis 105, a server 150 may be connected to chassis 105. For example, based on a level of network traffic associated with a network satisfying a threshold, a network operator may install server 150 to scale a capacity of chassis 105. Server 150 may include one or more network devices and/or computing resources. The one or more network devices may include and/or implement remote configuration device 155 and a set of virtual machines (VMs) 160-1 through 160-C (hereinafter referred to collectively as "virtual machines 160" and individually as "virtual machine 160"). In some implementations, server 150 and chassis 105 may communicate via a control board (CB) switch.

As further shown in FIG. 1B, and by reference number 180, configuration device 115 may determine configuration information, and may reconfigure routing for chassis 105. For example, configuration device 115 may detect server 150 based on server 150 being connected to chassis 105 (e.g., may detect server 150 automatically—i.e., without human input or configuration), and may determine a configuration for chassis 105 based on detecting server 150. In this case, remote configuration device 155 may configure a virtual local area network (VLAN) for server 150, a bridge for server 150, a set of communication protocols for server 150, or the like, and may advertise server 150 to configuration device 115. Configuration device 115 may determine a set of capabilities of server 150 based on receiving advertising information, such as determining a quantity of cores, a storage capacity, a memory capacity, or the like of server 150, and may update the set of resources for chassis 105 to include the resources of server 150. Configuration device 115 may configure slices for chassis 105 using resources of server 150. For example, configuration device 115 may transmit configuration information to remote configuration device 155 to configure virtual machines 160 to provide network traffic routing for chassis 105. In another example, configuration device 115 may determine to migrate one or more network slices from operating on one or more virtual machines 125 of chassis 105 to operating on one or more virtual machines 160 of server 150, thereby enabling an increased amount of computing resources associated with server 150 to be allocated to the one or more network slices. In this way, configuration device 115 enables automatic configuration of chassis 105 and server 150 based on a network operator powering on chassis 105 and server 150, and without the network operator manually configuring chassis 105 and server 150. In this way, configuration device 115 improves operation of chassis 105, server 150, and the network based on reducing a likelihood of an error relating to a human operator configuring a network and reducing an amount of time to configure the network relative to a human operator configuring the network.

In some implementations, configuration device 115 may configure additional virtual machines 125 or 160, fewer virtual machines 125 or 160, or different virtual machines 125 or 160 than the virtual machines 125 or 160 when reconfiguring network traffic routing for chassis 105. For example, configuration device 115 may cause one or more virtual machines 160 to be implemented on server 150, and may cause an update to network traffic routing (e.g., by causing computing resources implementing each network slice to update a routing table) to enable routing of network traffic using the one or more virtual machines 160. In some implementations, configuration device 115 may monitor a health of one or more virtual machines 160 via remote configuration device 155. In some implementations, configuration device 115 may migrate a virtual machine between routing element 110 and server 150 (e.g., from routing element 110 to server 150 or from server 150 to routing element 110).

In some implementations, configuration device 115 may migrate a network slice from a virtual machine 125 of chassis 105 to a virtual machine 160 of server 150. For example, configuration device 115 may determine, based on a set of computing resources of chassis 105 or allocated to a particular network slice of a particular virtual machine 125, that the particular network slice is to be migrated to server 150. Configuration device 115 may disable a backup virtual machine 125 corresponding to the particular virtual machine 125. Configuration device 115 may transmit a request to remote configuration device 155 to enable a virtual machine 160 as a backup for the particular network slice, and to synchronize a state of the virtual machine 160 as the backup and the particular virtual machine 125 as the primary for the particular network slice. In this case, based on determining that the virtual machine 160 is enabled as the backup for the particular network slice and synchronized with the particular virtual machine 125, configuration device 115 may trigger a switchover by transmitting information to a remote configuration device 155 to cause a state change for the virtual machine 160 from backup to primary, and transmitting information to the particular virtual machine 125 to cause a state change from primary to backup. Based on the state changes, configuration device 115 may disable the particular virtual machine 125, configuration device 115 may cause the virtual machine 160 to route network traffic for the particular network slice, and configuration device 115 may cause remote configuration device 155 to enable another virtual machine 160 as a backup for the virtual machine 160 that is the primary for the particular network slice.

As further shown in FIG. 1B, and by reference number 185, chassis 105 may route network traffic based on reconfiguring network traffic routing. For example, chassis 105 may utilize a set of network slices corresponding to virtual machines 125 and/or 160 to route traffic between endpoint network devices of a network. In some implementations, chassis 105 may route the network using server 150 based on reconfiguring network traffic routing to enable virtual machines 160 to route network traffic. In some implementations, chassis 105 may route the network traffic based on migrating network traffic routing for a slice of network traffic from a virtual machine 125 to a virtual machine 160, from a virtual machine 160 to a virtual machine 125, or the like.

In this way, configuration device 115 of chassis 105 permits configuration of virtual machines 125 using computing resources of routing element 110 and subsequent reconfiguration of chassis 105 to include virtual machines 160 using computing resources of server 150. Based on delaying installation of server 150 until needed, configuration device 115 defers expenditure, footprint need, and utilization of energy resources until network traffic routing capacity associated with server 150 is needed. Moreover, based on integrating server 150, configuration device 115 expands network traffic routing capacity of chassis 105 relative to a chassis that utilizes native virtual machines and not remote virtual machines.

As indicated above, FIGS. 1A and 1B are provided merely examples. Other examples are possible and may differ from what was described with regard to FIGS. 1A and 1B.

Figure 2:
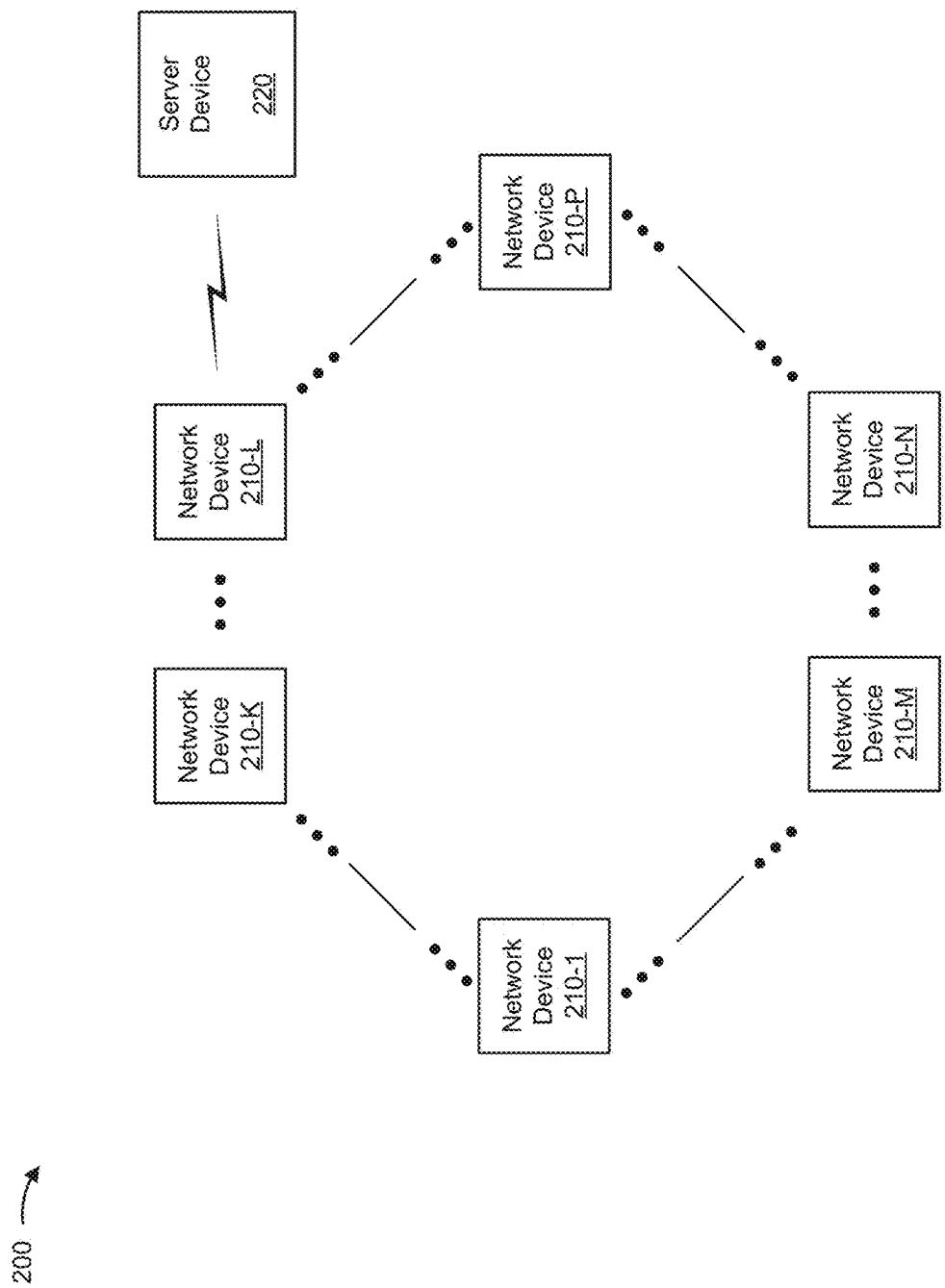
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210-1 through 210-P (P≥1) (hereinafter referred to collectively as "network devices 210," and individually as "network device 210"), a server device 220, and one or more networks. Devices of environment 200 may interconnect via wired connections, wireless connections, or a combination of wired and wireless connections.

Network device 210 includes one or more devices (e.g., one or more traffic transfer devices) capable of processing and/or transferring traffic between endpoint devices. For example, network device 210 may include a firewall, a router, a gateway, a switch device, a hub, a bridge, a reverse proxy, a server (e.g., a proxy server), a ToR switch, a load balancer, a switch interface board, a controller, a switching element, a packet processing component, or a similar device. In some implementations, network device 210 includes one or more computing resources to implement a virtual machine for routing network traffic for a network traffic slice. In some implementations, network device 210 may include a traffic transfer device associated with providing and/or receiving information. In some implementations, network device 210 may be housed in a chassis, such as a router chassis that includes multiple network devices 210. In some implementations, network device 210 may include a master orchestration module to control networking of a chassis. In some implementations, network device 210 may be a fabric line card of a switching fabric. In some implementations, network device 210 is included in, corresponds to, includes, and/or implements one or more of chassis 105, routing element 110, configuration device 115, switching device 120, virtual machines 125, and/or FPCs 130 as shown in FIGS. 1A and 1B.

Server device 220 includes one or more devices capable of storing, processing, and/or routing information associated with routing network traffic. For example, server device 220 may include a server that includes computing resources that may be utilized to establish one or more virtual machines for network traffic routing. In some implementations, server device 220 may include a communication interface that allows server device 220 to receive information from and/or transmit information to other devices in environment 200. In some implementations, server device 220 may implement a remote configuration device that may communicate with a network device 210 of a chassis to configure one or more virtual machines to operate using computing resources of server device 220. In some implementations, server device 220 corresponds to and/or implements one or more of server 150, remote configuration device 155, and/or virtual machines 160 as shown in FIG. 1B.

Network device 210 and server device 220 may be associated with one or more networks, in some implementations. Similarly, a network, of the one or more networks, may include one or more network devices 210 and/or one or more server devices 220. In some implementations, the one or more networks may include a cellular network (e.g., a long-term evolution (LTE) network, a 3G network, a code division multiple access (CDMA) network, a 4G network, a 5G network, etc.), a public land mobile network (PLMN), a local area network (LAN), a wide area network (WAN), a metropolitan area network (MAN), a telephone network (e.g., the Public Switched Telephone Network (PSTN)), a private network, a cloud-based computing network, an ad hoc network, an intranet, the Internet, a fiber optic-based network, a cloud computing network, a virtual private network (VPN), a subnet network (e.g., a subnet), and/or a combination of these or other types of networks.

In implementations, network device 210 and/or server device 220 may be a virtual device implemented by one or more computer devices of a cloud computing environment or a data center.

The number and arrangement of devices shown in FIG. 2 are provided as an example. In practice, there may be additional devices, fewer devices, different devices and/or networks, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
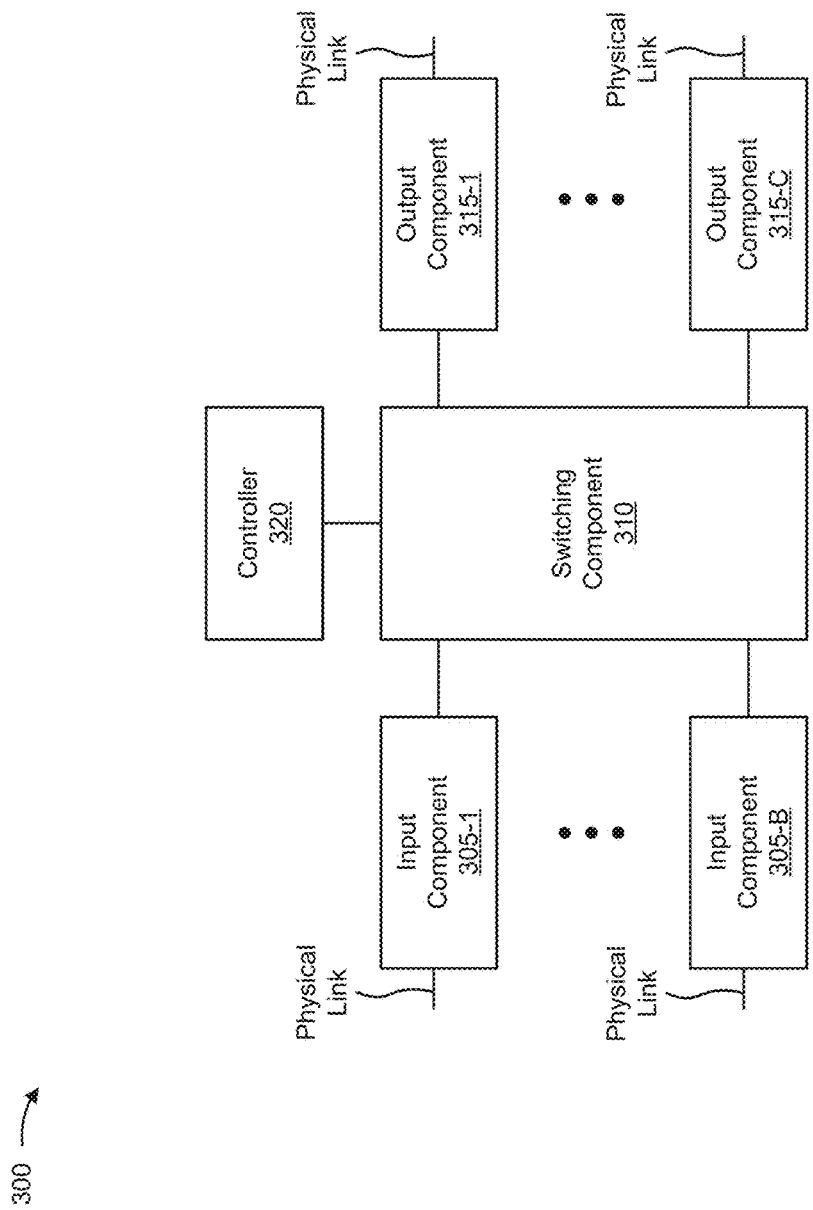
FIGS. 3A and 3B are diagrams of example components of one or more devices of FIG. 2.
Figure 3B:
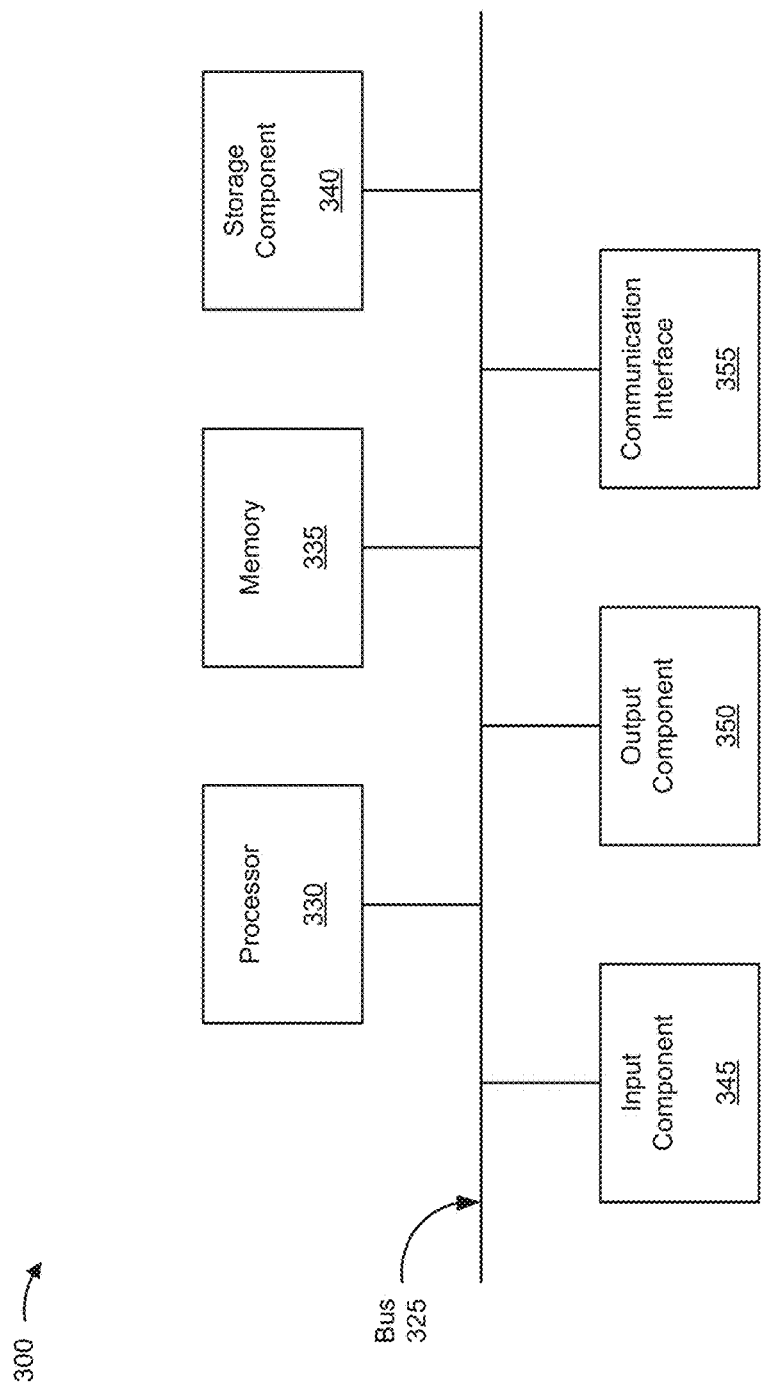

FIGS. 3A and 3B are diagrams of example components of a device 300. Device 300 may correspond to network device 210 and/or server device 220. In some implementations, network device 210 and/or server device 220 may include one or more devices 300 and/or one or more components of device 300. As shown in FIG. 3A, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. A processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

As shown in FIG. 3B, device 300 may include a bus 325, a processor 330, a memory 335, a storage component 340, an input component 345, an output component 350, and a communication interface 355.

Bus 325 includes a component that permits communication among the components of device 300. Processor 330 is implemented in hardware, firmware, or a combination of hardware and software. Processor 330 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 330 includes one or more processors capable of being programmed to perform a function. Memory 335 includes a random access memory (RAM), a read only memory (ROM), and/or another type of dynamic or static storage device (e.g., a flash memory, a magnetic memory, and/or an optical memory) that stores information and/or instructions for use by processor 330.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 345 includes a component that permits device 300 to receive information, such as via user input (e.g., a touch screen display, a keyboard, a keypad, a mouse, a button, a switch, and/or a microphone). Additionally, or alternatively, input component 345 may include a sensor for sensing information (e.g., a global positioning system (GPS) component, an accelerometer, a gyroscope, and/or an actuator). Output component 350 includes a component that provides output information from device 300 (e.g., a display, a speaker, and/or one or more light-emitting diodes (LEDs)).

Communication interface 355 includes a transceiver-like component (e.g., a transceiver and/or a separate receiver and transmitter) that enables device 300 to communicate with other devices, such as via a wired connection, a wireless connection, or a combination of wired and wireless connections. Communication interface 355 may permit device 300 to receive information from another device and/or provide information to another device. For example, communication interface 355 may include an Ethernet interface, an optical interface, a coaxial interface, an infrared interface, a radio frequency (RF) interface, a universal serial bus (USB) interface, a Wi-Fi interface, a cellular network interface, or the like.

Software instructions may be read into memory 335 and/or storage component 340 from another computer-readable medium or from another device via communication interface 355. When executed, software instructions stored in memory 335 and/or storage component 340 may cause processor 330 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIGS. 3A and 3B are provided as an example. In practice, device 300 may include additional components, fewer components, different components, or differently arranged components than those shown in FIGS. 3A and 3B. Additionally, or alternatively, a set of components (e.g., one or more components) of device 300 may perform one or more functions described as being performed by another set of components of device 300.

Figure 4:
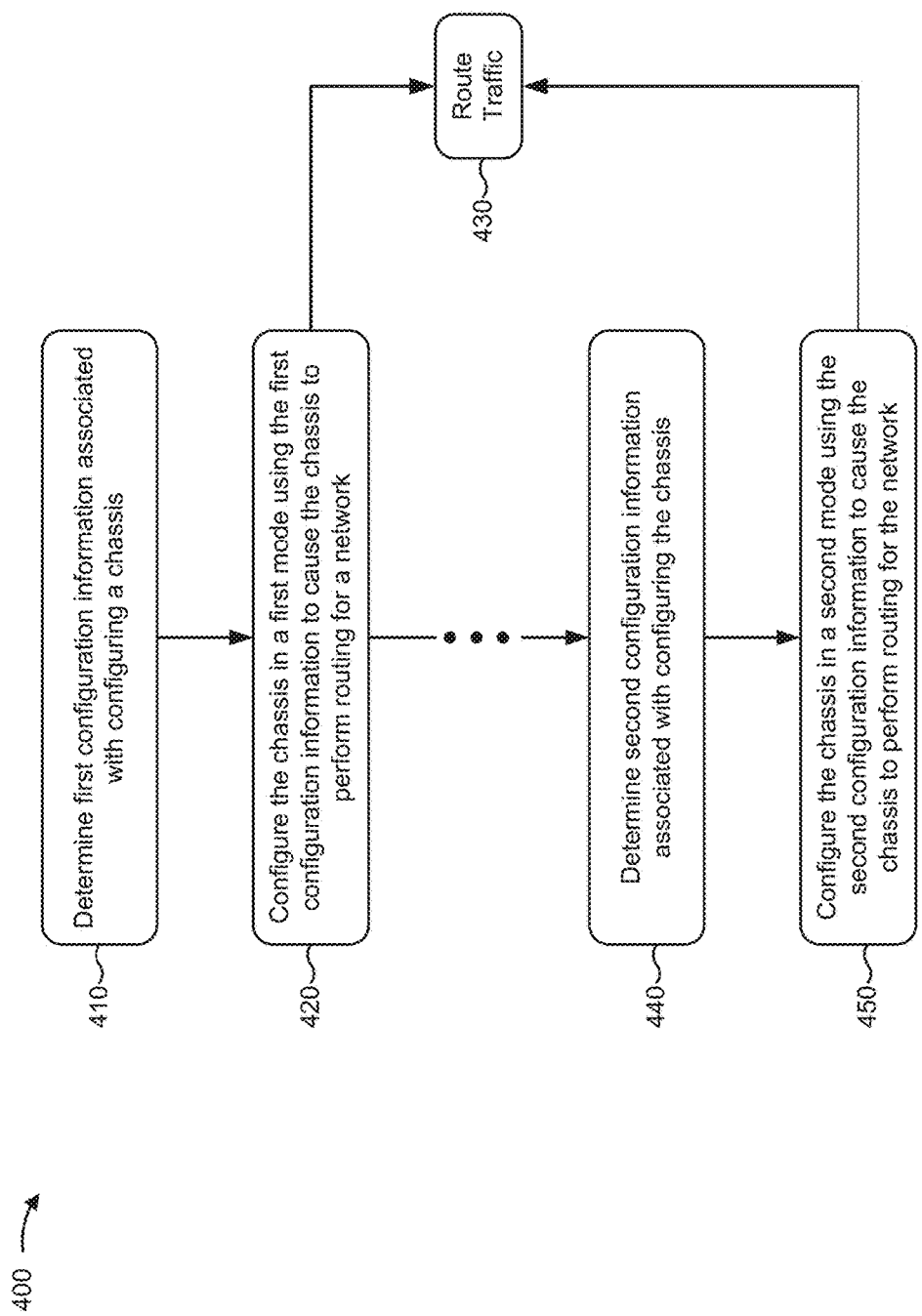
FIG. 4 is a flow chart of an example process for hybrid routing using virtual machines.

FIG. 4 is a flow chart of an example process 400 for hybrid routing using virtual machines. In some implementations, one or more process blocks of FIG. 4 may be performed by network device 210. In some implementations, one or more process blocks of FIG. 4 may be performed by another device or a group of devices separate from or including network device 210, such as server device 220.

As shown in FIG. 4, process 400 may include determining first configuration information associated with configuring a chassis (block 410). For example, network device 210 may determine the first configuration information for configuring the chassis (e.g., a chassis that includes network device 210). In some implementations, network device 210 may receive the first configuration information during an initial configuration procedure. For example, based on a network operator installing a chassis to route network traffic for a network (e.g., a campus network, a corporate network, a public network, etc.), network device 210 may detect the installation of the chassis, and may obtain first configuration information from a data structure at start-up. In some implementations, network device 210 may receive the first configuration information based on detecting a set of capabilities of the chassis. For example, network device 210 may determine a quantity of cores, a hyper-threading capability, an availability of memory resources, an availability of data storage resources, or the like for the chassis.

In some implementations, network device 210 may determine first configuration information identifying a quantity of virtual machines to establish for the chassis. For example, network device 210 may provide a user interface, and may receive, via the user interface, an instruction from a network operator to establish a particular quantity of virtual machines using computing resources of the chassis (e.g., computing resources of network device 210, computing resources of another network device 210, etc.). Additionally, or alternatively, network device 210 may detect a characteristic of a network, such as a network traffic throughput, and may determine a quantity of virtual machines based on the characteristic of the network. Additionally, or alternatively, network device 210 may determine the quantity of virtual machines based on resources of the chassis. For example, based on detecting a particular quantity of cores and a particular size of memory resources, network device 210 may determine to establish a particular quantity of virtual machines.

In this way, network device 210 obtains first configuration information for establishing network traffic routing for the chassis.

As further shown in FIG. 4, process 400 may include configuring the chassis in a first mode using the first configuration information to cause the chassis to perform routing for a network (block 420). For example, network device 210 may configure the chassis in the first mode using the first configuration information to cause the chassis (e.g., network device 210) to perform routing for the network. In some implementations, network device 210 may establish a set of virtual machines to configure the chassis in the first mode. For example, based on first configuration information indicating a first quantity of virtual machines to establish, network device 210 may configure resources of the chassis to establish the first quantity of virtual machines. In this case, network device 210 may allocate portions of a data plane (e.g., FPCs) to respective virtual machines to establish a set of network slices corresponding to the set of virtual machines. Additionally, or alternatively, network device 210 may allocate memory resources, processing resources, routing resources, or the like to establish the set of network slices. In some implementations, the set of virtual machines may be a set of guest network functions (GNFs). For example, network device 210 may assign a first network service to a first virtual machine and a second network service to a second virtual machine to permit the first virtual machine and the second virtual machine to operate independently.

In this way, network device 210 configures the chassis to perform network traffic routing using local virtual machines that operate using resources of the chassis.

As further shown in FIG. 4, process 400 may include routing traffic (block 430). For example, network device 210 may route traffic. In this case, network device 210 and/or one or more other network devices 210 of the chassis may receive network traffic from a first endpoint device (e.g., another network device 210), process network traffic, filter network traffic, and/or route network traffic to a second endpoint device (e.g., another network device 210) using the virtual machines operating locally using resources of the chassis. In some implementations, network device 210 routes network traffic using resources of the chassis and resources of server device 220. For example, based on configuring a set of virtual machines to operate remotely using resources of server device 220, network traffic may be routed by server device 220.

In some implementations, network device 210 may monitor a health of a set of virtual machines when routing network traffic. For example, network device 210 may monitor one or more virtual machines operating using resources of the chassis, directly, and may transmit information to server device 220 to cause server device 220 to monitor one or more virtual machines operating using resources of server device 220. In this case, server device 220 may be caused to transmit one or more health status reports to network device 210 to identify a status of the virtual machines operating using resources of server device 220. In some implementations, network device 210 may provide information associated with a health of the set of virtual machines. For example, network device 210 may transmit an alert, store an error log entry in an error log, alter a configuration of the set of virtual machines, restart one or more virtual machines, remove one or more virtual machines, add another virtual machine, alter a state of a virtual machine (e.g., from a backup state to a primary state, from a primary state to a backup state, etc.), or the like based on determining the health of the set of virtual machines.

As further shown in FIG. 4, process 400 may include determining second configuration information associated with configuring the chassis (block 440). For example, after configuring the chassis in the first mode based on the first configuration information, network device 210 may determine the second configuration information to re-configure the chassis. In some implementations, network device 210 may receive the second configuration information based on server device 220 being connected to the chassis. For example, based on a network operator installing server device 220, network device 210 may detect server device 220, and may receive the second configuration information based on detecting server device 220. In some implementations, network device 210 may detect server device 220 based on receiving an advertisement message from server device 220. For example, network device 210 may receive an advertisement message via a network interface with server device 220 identifying a capability of server device 220. In this case, the information identifying the capability of server device 220 may identify a quantity of cores of server device 220, an availability of storage resources of server device 220, an availability of memory resources of server device 220, or the like.

In some implementations, network device 210 may receive second configuration information identifying a quantity of virtual machines to implement using the resources of the chassis and resources of server device 220. For example, network device 210 may provide a user interface, and may receive, via the user interface, an indication of a quantity of network slices, guest network functions, or the like that are to be implemented.

In some implementations, network device 210 may determine second configuration information relating to migrating network traffic routing between the chassis and server device 220. For example, network device 210 may determine that resources of the chassis satisfy a threshold, and may determine to migrate network traffic routing from a virtual machine of the chassis to a virtual machine of server device 220, to enable additional computing resources to be allocated for network traffic routing. In some implementations, network device 210 may determine the second configuration information relating to migrating network traffic routing based on receiving user input via a user interface. For example, network device 210 may receive user input indicating that a particular quantity of computing resources (e.g., processing resources, memory resources, storage resources, etc.) is to be allocated to a particular network slice, and may determine that the chassis does not satisfy a threshold resource availability to allocate the particular quantity of computing resources for the particular network slice. In this case, network device 210 may determine second configuration information to migrate the network slice from the chassis to server device 220 to enable the particular quantity of computing resources to be allocated for the particular network slice.

In this way, network device 210 receives second configuration information to integrate resources of server device 220 into the chassis for network traffic routing or migrate network traffic routing between the chassis and server device 220.

As further shown in FIG. 4, process 400 may include configuring the chassis in a second mode using the second configuration information to cause the chassis to perform routing for the network (block 450). For example, network device 210 may configure the chassis in the second mode using the second configuration information to cause the chassis to perform routing for the network. In some implementations, network device 210 may alter a quantity of virtual machines operated to perform routing for the network. For example, network device 210 may transfer from a first mode associated with a first quantity of virtual machines to a second mode associated with a second quantity of virtual machines. In some implementations, network device 210 may utilize resources of server device 220 for traffic routing via the chassis. For example, network device 210 may transmit information to server device 220 to configure one or more virtual machines to operate using resources of server device 220 (e.g., memory resources, processing resources, routing resources, etc.). In some implementations, network device 210 may communicate with a configuration device implemented by server device 220 to cause server device 220 to be configured to perform network traffic routing or to migrate a network slice between operating on the chassis and operating on server device 220.

In some implementations, network device 210 may determine a first subset of virtual machines to operate using resources of the chassis and a second subset of virtual machines to operate using resources of server device 220. For example, network device 210 may determine, based on the second configuration information, to operate a first virtual machine locally using resources of the chassis and to operate a second virtual machine remotely using resources of server device 220. In some implementations, network device 210 may establish a set of network slices using resources of server device 220 based on the second configuration information. For example, based on receiving second configuration information indicating that network device 210 is to establish a quantity of network slices greater than a threshold (e.g., greater than a quantity of virtual machines that can be operated using resources of the chassis), network device 210 may establish one or more network slices using one or more virtual machines of server device 220. In this case, network device 210 may transmit information to server device 220 to allocate a portion of the data plane to server device 220 and to cause server device 220 to allocate computing resources to a set of virtual machines. In this case, the chassis and server device 220 route network traffic for a network.

In some implementations, network device 210 may migrate routing functionality between the chassis and server device 220 to configure network traffic routing. In some implementations, network device 210 may migrate the routing functionality using a state transition. For example, network device 210 may transmit a message to server device 220 to cause a virtual machine of server device 220 to transition from a backup state to a primary state, and may cause a virtual machine of the chassis to transition from a primary state to a backup state, to cause a network slice to migrate from being routed using the chassis to being routed using server device 220. In some implementations, the state transition may occur concurrently. In some implementations, the state transition may occur sequentially, such as within a threshold period of time. In this way, network device 210 reduces a likelihood of dropped network traffic for the network slice during migration.

In some implementations, network device 210 may migrate a network slice routing functionality from the chassis to server device 220. For example, based on the second configuration information, network device 210 may cause a first, backup virtual machine for a second, primary virtual machine of the chassis to be disabled; a third virtual machine of server device 220 to be enabled as a backup for a third virtual machine of the primary virtual machine of the chassis; the second, primary virtual machine of the chassis to be switched to a backup, second virtual machine and the backup, third virtual machine of server device 220 to be switched to a primary, third virtual machine; and the backup, second virtual machine to be disabled. In this way, network device 210 may migrate a network slice from operating on the second virtual machine of the chassis to the third virtual machine of server device 220.

In some implementations, network device 210 may migrate a network slice routing functionality from server device 220 to the chassis. For example, network device 210 may cause a first, backup virtual machine of server device 220 for a second, primary virtual machine of server device 220 to be disabled; a third virtual machine of the chassis to be enabled as a backup, third virtual machine of the primary virtual machine of server device 220; the second, primary virtual machine to be switched to a backup, second virtual machine and the backup, third virtual machine to be switched to a primary, third virtual machine; and the backup, second virtual machine to be disabled. In this way, network device 210 may migrate a network slice from operating on the second virtual machine of server device 220 to operating on the third virtual machine of the chassis.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5E are diagrams of an example implementation 500 relating to example process 400 shown in FIG. 4. FIGS. 5A-5E show an example of migrating a network slice.

Figure 5A:
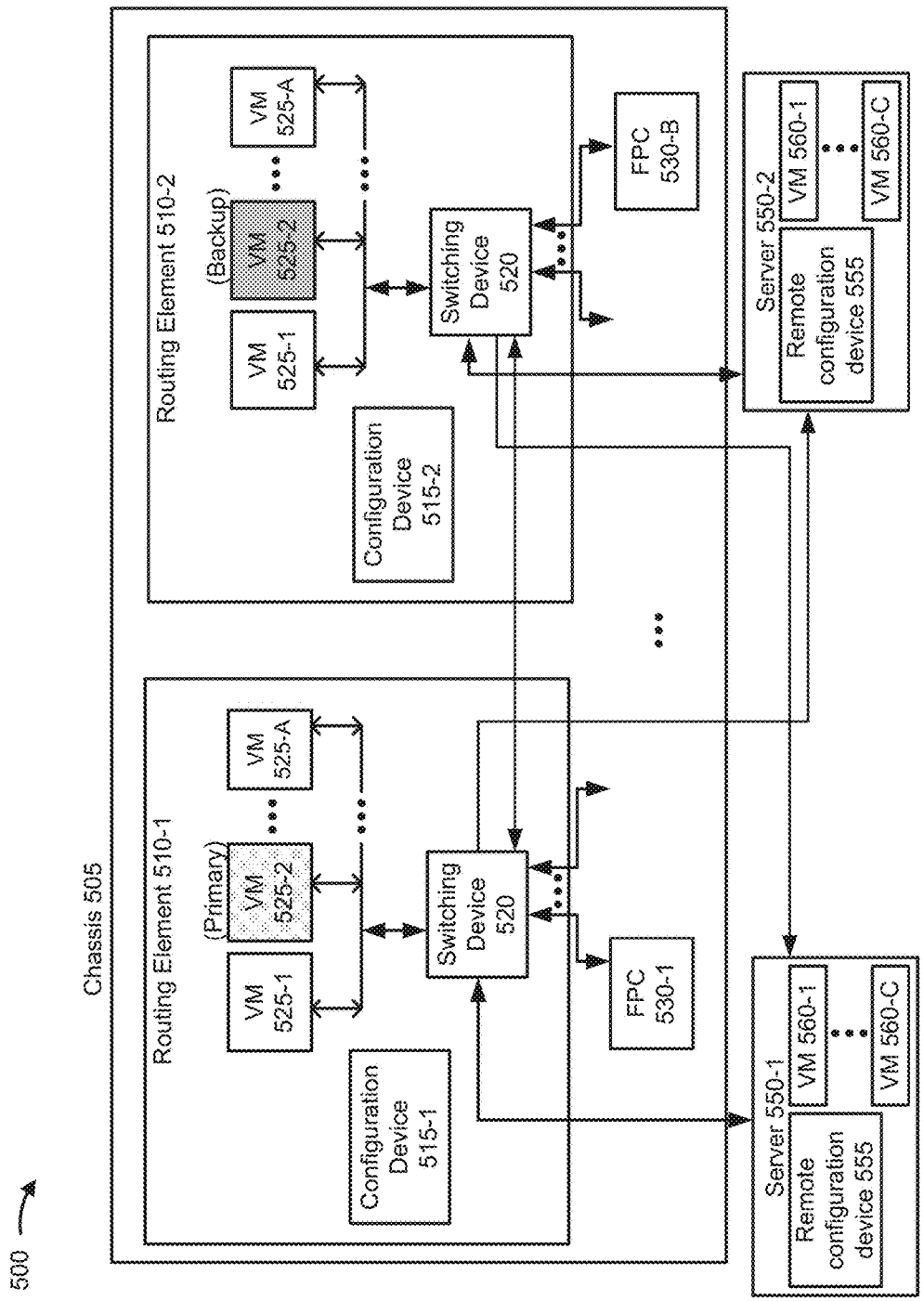
FIGS. 5A-5E are diagrams of an example implementation of hybrid routing using virtual machines.

As shown in FIG. 5A, a chassis 505 includes routing elements 510-1 and 510-2. Routing elements 510 include configuration devices 515, switching devices 520, and VMs 525. Chassis 505 includes FPCs 530. Routing elements 510 are connected to servers 550, which each include remote configuration devices 555 and VMs 560. VM 525-2 of routing element 510-1 is configured as a primary virtual machine, and VM 525-2 of routing element 510-2 is configured as a backup virtual machine for VM 525-2 of routing element 510-1.

Figure 5B:
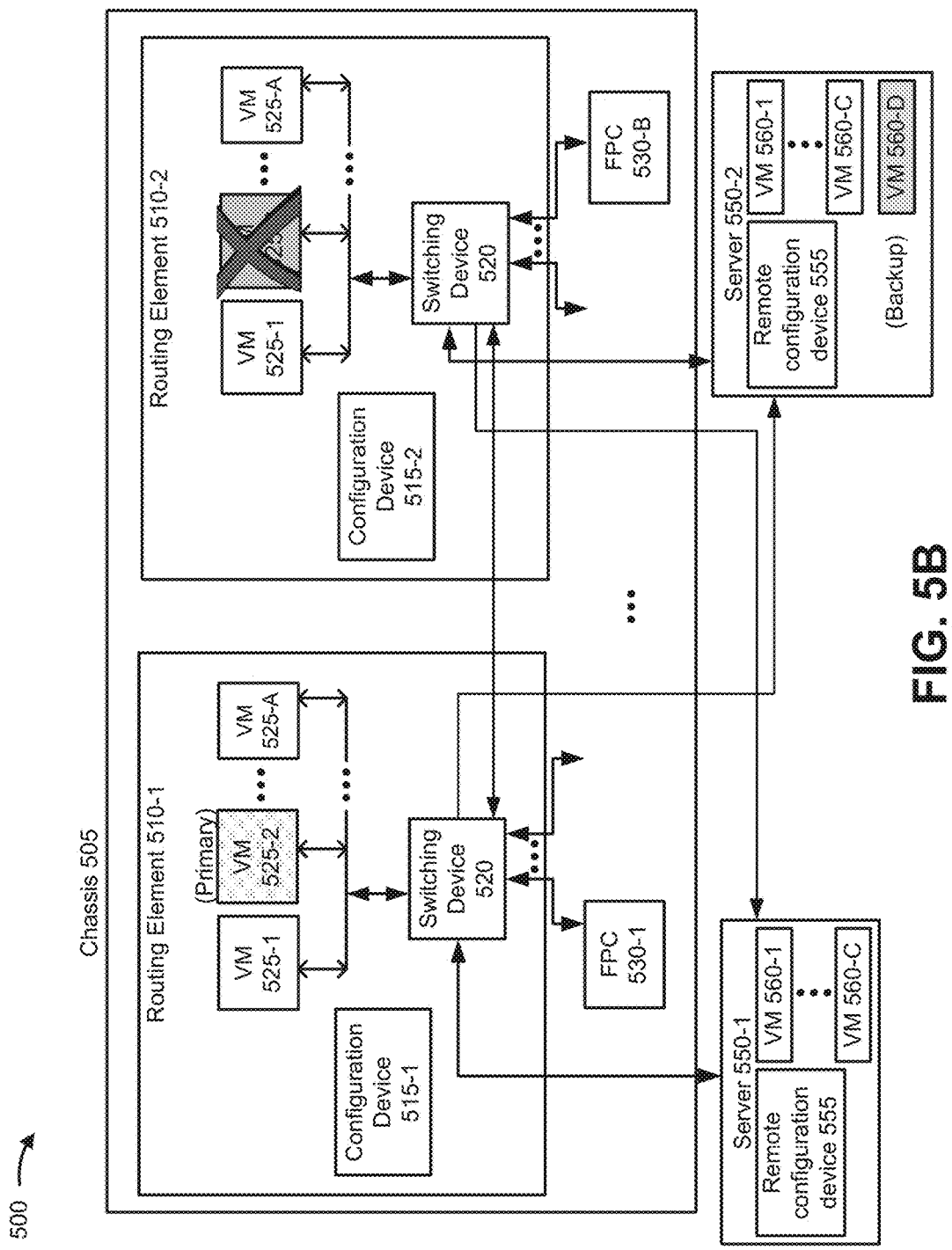

As shown in FIG. 5B, at a particular time, configuration devices 515 (e.g., configuration device 515-1 acting as a primary configuration device) determines to migrate VMs 525-2 from routing elements 510 to servers 550. In this case, configuration device 515-1 causes VM 560-D to be established on server 550-2 as a backup virtual machine for VM 525-2 of routing element 510-1. Based on establishing VM 560-D, configuration device 515-1 causes VM 525-2 of routing element 510-2 to be deactivated.

Figure 5C:
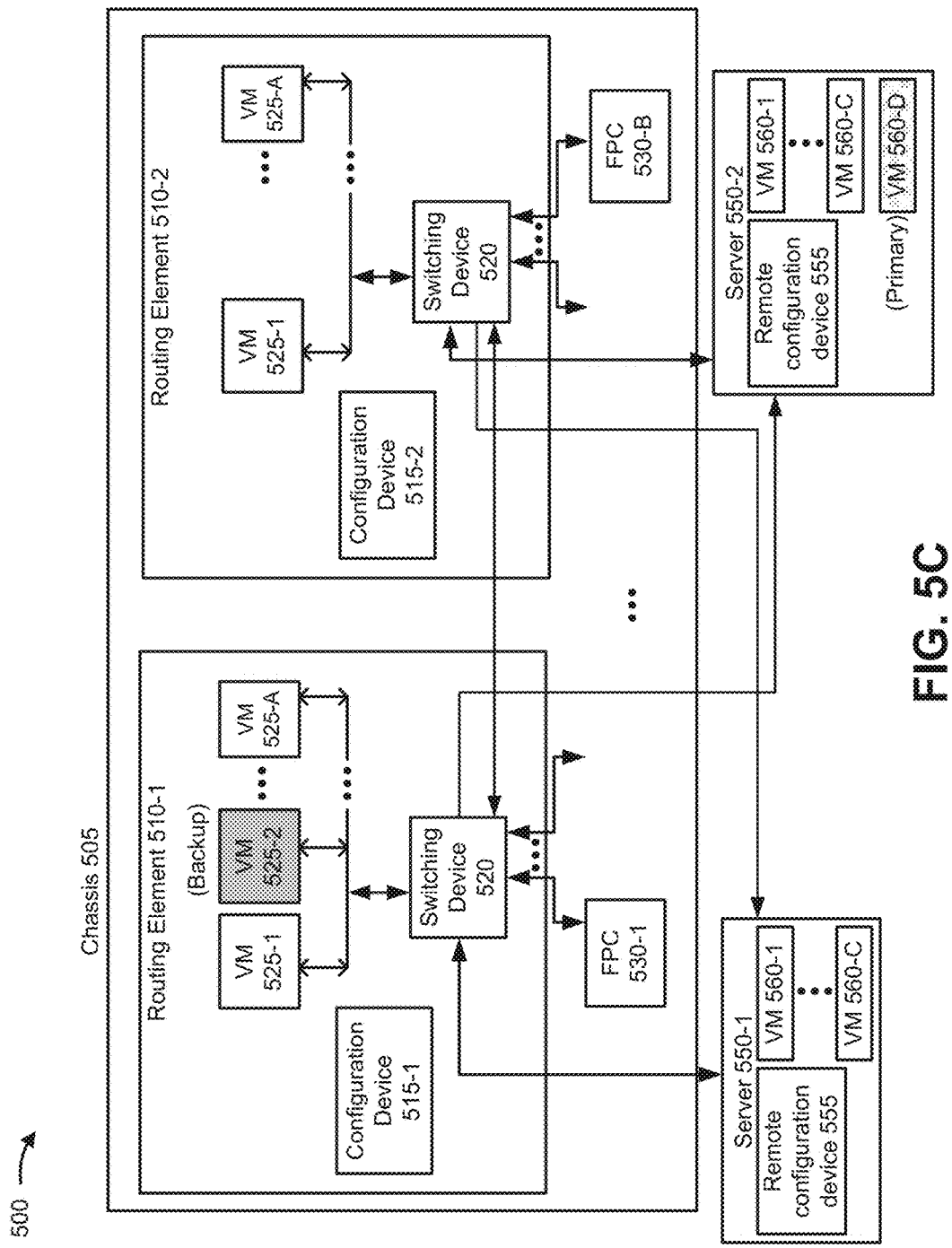

As shown in FIG. 5C, VM 525-2 of routing element 510-2 is removed based on being deactivated. Configuration device 515-1 causes VM 560-D of server 550-2 to become a primary virtual machine, and causes VM 525-2 of routing element 510-1 to become a backup virtual machine for VM 560-D.

Figure 5D:
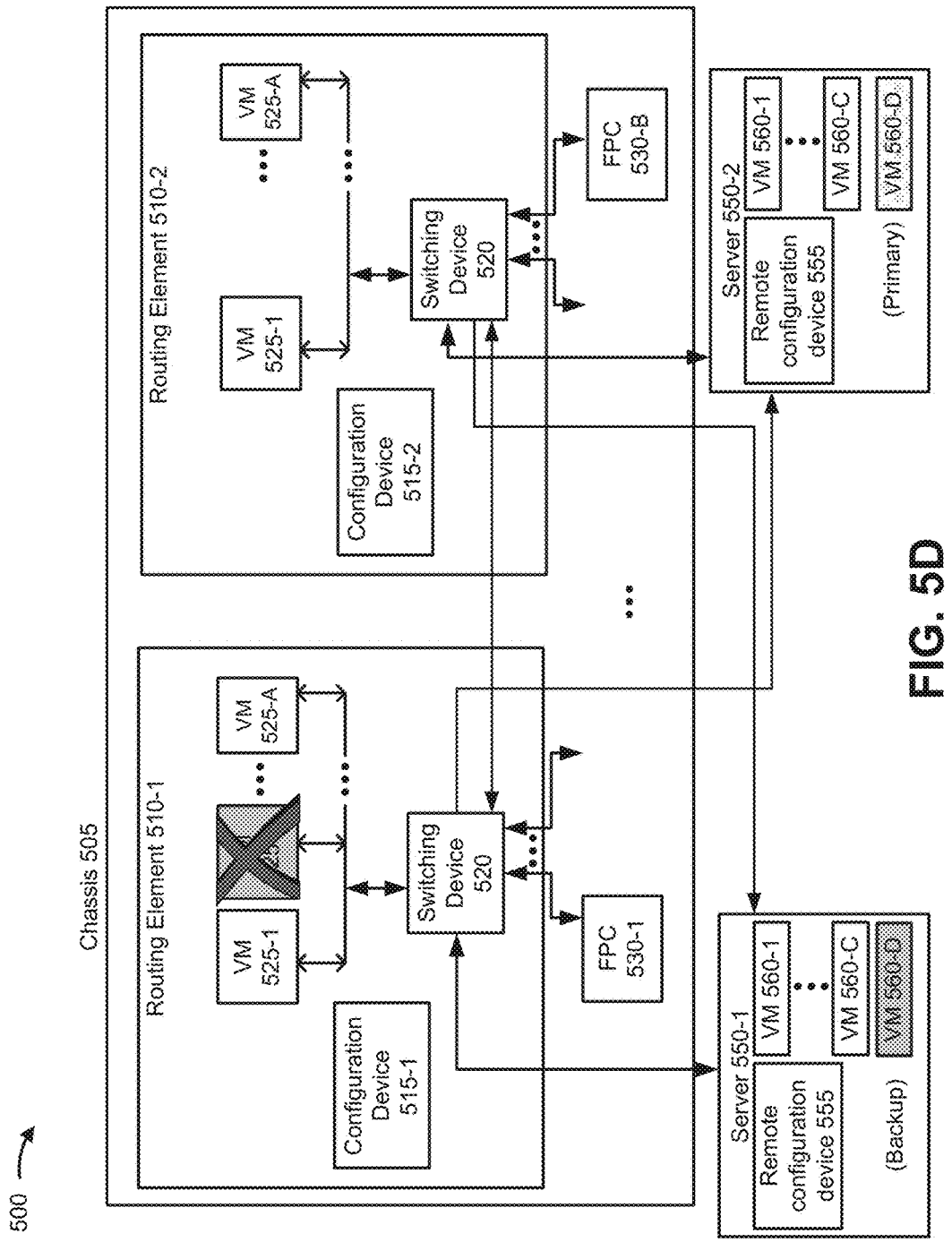

As shown in FIG. 5D, configuration device 515-1 causes VM 560-D to be established on server 550-1 as a backup virtual machine for VM 560-D on server 550-2. Based on establishing VM 560-D on server 550-1, configuration device 515-1 deactivates VM 525-2 of routing element 510-2.

Figure 5E:
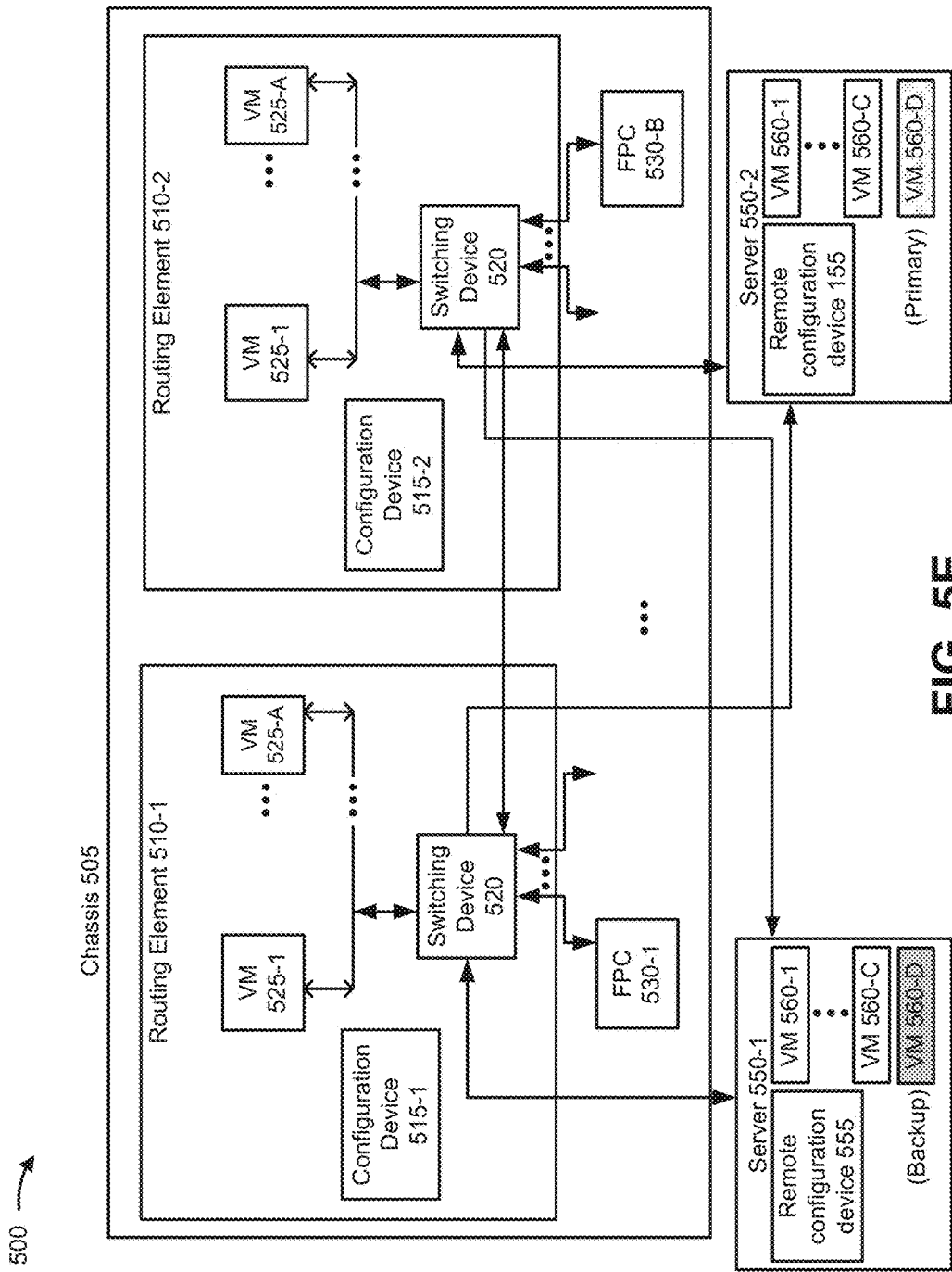

As shown in FIG. 5E, VM 525-2 of routing element 510-1 is removed based on being deactivated. In this case, a network slice that was associated with VMs 525 is now migrated to VMs 560 based on VMs 560 being established. In this way, a network slice is migrated from chassis 505 to servers 550. In another example, a network slice may be migrated from servers 550 to chassis 505.

As indicated above, FIGS. 5A-5E are provided merely as examples. Other examples are possible and may differ from what was described with regard to FIGS. 5A-5E.

In this way, network device 210 may enable a network traffic routing capability of a chassis to be expanded by dynamically reconfiguring the chassis to utilize resources of server device 220 for network traffic routing, to migrate a network slice between virtual machines operating on the chassis and virtual machines operating on server device 220, or the like. Moreover, based on integrating one or more server devices 220 and the chassis, network device 210 may improve network traffic routing, such as by improving routing throughput, reducing dropped packets, or the like. Furthermore, network device 210 may enable automatic configuration of network traffic routing and migration of routing functionalities for a chassis and/or server device 220 (i.e., without intervention of a network operator to perform manual configuration after power up).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories:
one or more processors, communicatively coupled to the one or more memories, to:
   determine first configuration information associated with configuring a chassis;
   configure the chassis in a first mode using the first configuration information to cause the chassis to perform routing for a network;
   determine, after a first period of routing for the network, second configuration information associated with configuring the chassis,
      the second configuration information relating to utilizing one or more computing resources of a server device external to the chassis to perform routing for the chassis;
   configure the chassis in a second mode using the second configuration information to cause the chassis to perform, in a second period, routing for the network; and
   transmit one or more instructions to the server device to cause routing to be configured for the server device,
      the one or more instructions including an instruction regarding a portion of a data plane that is to be routed utilizing the one or more computing resources of the server device, and
   another portion of the data plane is to be routed using one or more computing resources associated with the chassis.

2. The device of claim 1, where the one or more processors, when configuring the chassis in the second mode, are to:
   configure a set of virtual machines implemented by one or more computing resources of the chassis to perform routing for the network.

3. The device of claim 1, where the one or more processors, when configuring the chassis in the second mode, are to:
   configure a plurality of network slices for routing network traffic for the network.

4. The device of claim 1, where the one or more instructions include an instruction to implement one or more virtual machines using the one or more computing resources of the server device.

5. The device of claim 1, where the one or more processors are further to:
   receive advertising information from the server device,
      the advertising information identifying a set of capabilities of the server device; and
   where the one or more processors, when determining the second configuration information, are to:
      determine the second configuration information based on the advertising information.

6. The device of claim 1, where the one or more processors are further to:
   monitor a health of one or more computing resources of the chassis; and
   generate an alert or store an error log entry based on the health of the one or more computing resources of the chassis.

7. The device of claim 1, where the one or more processors are further to:
   receive a health status report regarding the one or more computing resources of the server device from the server device; and
   generate an alert or store an error log entry based on the health status report.

8. A non-transitory computer-readable medium storing instructions, the instructions comprising:
   one or more instructions that, when executed by one or more processors, cause the one or more processors to:
      determine, after a first period of routing for a network, configuration information associated with configuring a chassis to migrate a network slice routing functionality between a first virtual machine implemented by computing resources of the chassis and a second virtual machine implemented by computing resources of a server device external to the chassis; and
      configure the chassis using the configuration information to migrate the network slice routing functionality between the first virtual machine and the second virtual machine,
         the configuration information indicating:
            a portion of a data plane, associated with the network slice, that is to be routed utilizing the second virtual machine, and
            another portion of the data plane, associated with another network slice, that is to be routed utilizing the first virtual machine.

9. The non-transitory computer-readable medium of claim 8, where the one or more instructions, that cause the one or more processors to configure the chassis, cause the one or more processors to:
   disable a third virtual machine, of the chassis, that is configured as a backup to the first virtual machine,
      the first virtual machine being configured as a primary virtual machine;
   cause the second virtual machine to be configured as the backup to the first virtual machine;
   cause, after causing the second virtual machine to be configured as the backup to the first virtual machine, a state transition for the first virtual machine and the second virtual machine,
      the first virtual machine switching from the primary virtual machine to the backup, the second virtual machine switching from the backup to the primary virtual machine; and disable the first virtual machine after causing the state transition.

10. The non-transitory computer-readable medium of claim 8, where the one or more instructions, that cause the one or more processors to configure the chassis, cause the one or more processors to:

disable a third virtual machine, of the server device, that is configured as a backup to the second virtual machine, the second virtual machine being configured as a primary virtual machine;

cause the first virtual machine to be configured as the backup to the second virtual machine;

cause, after causing the first virtual machine to be configured as the backup to the second virtual machine, a state transition for the second virtual machine and the first virtual machine, the second virtual machine switching from the primary virtual machine to the backup, the first virtual machine switching from the backup to the primary virtual machine; and disable the second virtual machine after causing the state transition.

11. The non-transitory computer-readable medium of claim 8, where the one or more instructions, when executed by the one or more processors, further cause the one or more processors to:

cause network traffic to be routed for the network slice based on configuring the chassis.

12. The non-transitory computer-readable medium of claim 8, where the network slice represents the portion of the data plane for the chassis.

13. The non-transitory computer-readable medium of claim 8, where the one or more instructions, when executed by the one or more processors, cause the one or more processors to:

configure the chassis to switch from a first mode, where the chassis performs routing for the network including the network slice independently of the server device, to a second mode where the chassis uses one or more computing resources of the server device to perform routing for the network.

14. The non-transitory computer-readable medium of claim 8, where the one or more instructions, that cause the one or more processors to configure the chassis, cause the one or more processors to:

switch between a first backup virtual machine implemented by the chassis and a second backup virtual machine implemented by the server device.

15. A method, comprising:

determining, by a device, first configuration information associated with configuring a chassis, the first configuration information relating to utilizing only one or more computing resources of the chassis to perform routing for the chassis;

configuring, by the device, the chassis in a first mode using the first configuration information to cause the chassis to perform routing for a network;

determining, by the device and after configuring the chassis in the first mode, second configuration information associated with configuring the chassis, the second configuration information relating to utilizing one or more computing resources of a server device external to the chassis to perform routing for the chassis; and configuring, by the device, the chassis in a second mode using the second configuration information to cause the chassis to perform routing for the network, a network slice, representing a portion of a data plane, to be migrated from a first virtual machine implemented using the one or more computing resources of the chassis to a second virtual machine implemented using the one or more computing resources of the server device, another network slice, representing another portion of the data plane, to be routed utilizing one or more computing resources of the chassis, and the migration to be performed using a state transition of the first virtual machine from a primary state to a backup state and the second virtual machine from a backup state to a primary state.

16. The method of claim 15, where configuring the chassis in the second mode comprises:

establishing one or more virtual machines operating using the one or more computing resources of the server device to perform network traffic routing for the chassis.

17. The method of claim 15, where the chassis and the server device communicate via a control board switch.

18. The method of claim 15, further comprising:

providing a user interface to receive the first configuration information or the second configuration information.

19. The method of claim 15, further comprising:

monitoring a health of one or more computing resources of the chassis; and generating an alert or store an error log entry based on the health of the one or more computing resources of the chassis.

20. The method of claim 15, further comprising:

receiving a health status report regarding the one or more computing resources of the server device from the server device; and generating an alert or store an error log entry based on the health status report.

* * * * *